(12) United States Patent
Chopdekar et al.

(10) Patent No.: US 11,743,306 B2
(45) Date of Patent: Aug. 29, 2023

(54) INTELLIGENT SCREEN AND RESOURCE SHARING DURING A MEETING

(71) Applicant: Avaya Management L.P., Durham, NC (US)

(72) Inventors: Sandesh Chopdekar, Pune (IN); Valentine C. Matula, Granville, OH (US); Pushkar Deole, Pune (IN); Navin Daga, Silapathar (IN)

(73) Assignee: Avaya Management L.P., Durham, NC (US)

( * ) Notice: Subject to any disclaimer, the term of this patent is extended or adjusted under 35 U.S.C. 154(b) by 0 days.

(21) Appl. No.: 17/223,896

(22) Filed: Apr. 6, 2021

(65) Prior Publication Data

US 2022/0321616 A1   Oct. 6, 2022

(51) Int. Cl.
*H04L 65/403* (2022.01)
*G06F 3/14* (2006.01)
*G06V 10/40* (2022.01)
*G06V 30/10* (2022.01)

(52) U.S. Cl.
CPC .......... *H04L 65/403* (2013.01); *G06F 3/1454* (2013.01); *G06V 10/40* (2022.01); *G06V 30/10* (2022.01)

(58) Field of Classification Search
CPC ........ H04L 65/403; H04L 12/18; H04M 3/56; H04N 7/15; G06F 3/14; G06F 3/1454; G06V 10/40; G06V 30/10
USPC ........................................................ 709/205
See application file for complete search history.

(56) References Cited

U.S. PATENT DOCUMENTS

| | | | |
|---|---|---|---|
| 7,221,387 B2* | 5/2007 | Fernandez | H04N 21/4786 348/E7.071 |
| 11,165,755 B1* | 11/2021 | Qian | H04N 5/272 |
| 2006/0053196 A1* | 3/2006 | Spataro | H04L 65/403 709/205 |
| 2011/0268418 A1* | 11/2011 | Jones | H04L 12/1831 348/E7.083 |
| 2011/0271192 A1* | 11/2011 | Jones | G06F 3/0421 709/227 |
| 2013/0145284 A1* | 6/2013 | Anantharaman | H04M 3/567 715/753 |
| 2014/0092112 A1* | 4/2014 | Solomon | G09G 5/393 345/545 |
| 2014/0104369 A1* | 4/2014 | Calman | H04M 3/567 348/14.08 |
| 2015/0121466 A1* | 4/2015 | Brands | H04L 63/08 726/4 |
| 2015/0149929 A1* | 5/2015 | Shepherd | H04L 65/403 715/753 |
| 2016/0094593 A1* | 3/2016 | Priya | H04L 65/403 709/204 |

(Continued)

*Primary Examiner* — James N Fiorillo
(74) *Attorney, Agent, or Firm* — Sheridan Ross P.C.

(57) ABSTRACT

Electronic conferences routinely include images of documents and other resources. Accessing an address of the resource and including a link to the resource in the conference, remote participants may access the resource utilizing a native application. If the address of a resource is inaccessible to at least some of the participants, a temporary copy may be automatically provided to a secondary address and the secondary address provided in the conference. The temporary copy may be automatically deleted upon the conference ending.

16 Claims, 6 Drawing Sheets

(56) References Cited

U.S. PATENT DOCUMENTS

| | | | |
|---|---|---|---|
| 2016/0202878 A1* | 7/2016 | Dunn | G06F 3/0481 |
| | | | 715/753 |
| 2017/0006162 A1* | 1/2017 | Bargetzi | H04N 7/147 |
| 2017/0293458 A1* | 10/2017 | Poel | H04N 7/152 |
| 2021/0072885 A1* | 3/2021 | Ranchal | G06F 3/04847 |
| 2021/0377322 A1* | 12/2021 | Vajravel | H04L 12/1827 |

* cited by examiner

INTELLIGENT SCREEN AND RESOURCE SHARING DURING A MEETING

COPYRIGHT NOTICE

A portion of the disclosure of this patent document contains material that is subject to copyright protection. The copyright owner has not objected to the facsimile reproduction by anyone of the patent document or the patent disclosure as it appears in the Patent and Trademark Office patent files or records, but otherwise reserves all copyright rights whatsoever.

FIELD OF THE DISCLOSURE

The invention relates generally to systems and methods for communications and particularly to communications comprising shared screen content.

BACKGROUND

Online meetings are now commonplace. A presenter speaks and may show images of themselves, documents, application displays, etc. as a portion of the conference content. As a benefit, the participants may see the same content as if they were physical present with the presenter. For example, a meeting may be conducted by a presenter (e.g., a scrum master reviewing tickets with the team). A resource, such as website, document, spreadsheet, cloud-based documents, etc., may be presented for viewing by all participants.

Often, a link is accessed by the presenter. The link may be to a website or document maintained on a server or online repository. The document is loaded in an application on the presenter's device for discussion. If the participants want direct access to the document, a copy of the document or link to the document may be provided, such as by the presenter verbally describing the location or providing a link in a subsequent email or text-chat. Presenters may seek information from a participant, which in turn requires the participant to open a new application (e.g., dedicated application, web browser, file manager, etc.), locate and load the document, and then discuss the document and/or provide edits to the document. If a host, such as the presenter, has enabled participants to share their screen, the document may be included in the conference for viewing by the other participants. If other participants wish to view the native document, they may open their respective application and access the document.

Viewing remote documents may be difficult if the specific document or location is not readily known by the participants. For example, a presentation may have limited video resolution and the fine detail of an application, when shared as a screen-share image by another participant, may be difficult or impossible to read. However, loading the document into a native application (e.g., browser, word processing application, spreadsheet application, etc.) allows remote participants to have a clear view of the document. This can take time, especially if there is confusion about which document to load, its location, or the application to use. As a result, electronic conferences often spend time addressing the overhead of waiting for all participants to find and load a document being discussed during the conference.

SUMMARY

In prior art systems, electronic conferences conducted over a network with one or more remote participants, or as used herein, a "conference," may comprise the sharing of resources (e.g., documents, files, web pages, spreadsheets, word processing files, etc.). If the participants want to review the resource beyond the portion that is provided during the conference, such as a screen share image of the presenter's display device, the presenter may share the resource or a link to the resource, such in an email or text message. For example, a team may be reviewing technical support tickets during a conference. A website may be accessed to present statistics or details of particular tickets. If a team member is asked about a particular ticket identified in a spreadsheet being discussed, the team member may need to launch an application, such as a browser, manually copy and retype the ticket number to navigate to the particular ticket. If they do not have the particular, ticket number, URL, or other indicia of the ticket readily available, this may be a time consuming and error prone endeavor while the application is launched and the (hopefully) correct ticket is accessed. This is exacerbated if the team member is not aware in advance that the particular ticket will need to be accessed.

These and other needs are addressed by the various embodiments and configurations of the present invention. The present invention can provide a number of advantages depending on the particular configuration. These and other advantages will be apparent from the disclosure of the invention(s) contained herein.

In one embodiment, a resource (e.g., document, data file, web page, etc.) is being shown by a presenter of a conference, such as via a screen-share feature of a conferencing application. The resource itself may then be shared with the participants via a link (e.g., URL, network address, file path, etc.) that may then be selected by the participants to access the resource.

In another embodiment, when a user selects "share screen" in a conference client, the conferencing application client automatically or prompts the user to authorize the conferencing application to share a link to the resource with the other participants. If the user agrees, the link or location of the shared resource, will be shared with other participants in the conference. The link to the resource is then automatically provided to a participant, such as in a chat window to the other participant(s) where the link can be maintained for automatic and/or manual selection by each participant utilizing their respective participant device(s). Additionally or alternatively, the link may be presented on the screen of a participant's conference client, such as to flash occasionally or upon a manual triggering or to display a window listing available links to resources. For example, in the ticketing system example above, a link to a shared page or specific ticket may be provided to enable each participant to view the resource in a native format, via the associated application launched by the participant's device, and as a result not be limited to the resolution provided by the screen-share or a read-only copy of the presenter's currently viewed content.

In another example, a presenter is sharing a spreadsheet maintained in a corporate cloud service. The presenter has configured the client to prompt before sharing. Once the resource is presented, the presenter agrees to share a link and the resource's link is automatically provided to a location, such as a chat window.

In another embodiment, the location of a resource may provide as a data record of an application programming interface (API) connection of an associated application, driver, or as a native service of an operating system. "Screen scraping" may identify URLs or other addresses and overlay the image with a clickable link with the fully qualified URL.

Additionally or alternatively, accessing a resource while a conferencing application is current being executed, or at least executed with an ongoing conference with at least one other participant, causes the resource to made available, automatically or with the user's authorization, to the other participants. As a further option, a list of one or more resources to be shared may be created before a conference and then automatically shared during the conference and/or notified of the links before the conference, such as in an automatically generated text message or email. In another embodiment, an image of all or a partial URL within a visual portion of a presentation, such as an address bar of a browser, may be overlayed with a link enabling participants to click on the presented address and access the resource. The location may be remotely accessed by the other participants to retrieve the resource or temporary copy of the resource prior to, during, or after the conference. The opportunity to retrieve the temporary copies after the conference may be limited to a previously determine period of time (e.g., ten minutes after the conference ends, after thirty of the forty-five participants have accessed the resource, etc.).

In another embodiment, a resource may be directly accessible to the other participants of a conference, such as a cloud service's server. However, other documents may not be accessible in their current location by at least one other participant. For example, the resource may be stored on a local drive or a protected directory or server. Accordingly, a secondary location may be identified, such as an accessible cloud directory and a copy of the document automatically copied to the secondary location with the address of the resource at the secondary location provided during the conference. Such locations may be automatically deleted upon termination of the conference. As a further option, resource metadata may be provided for viewing by the other participants.

In another embodiment, various configuration may be applied to a conferencing client, API, service, driver, etc. to provide access to a resource for remote users of a conference. For example, a client may be configured to always share links, never share links, or to prompt before sharing a particular resource. Additionally or alternatively, sharing may be provided to all participants or a subset of the participants of the conference, such as to pick individuals or groups (e.g., departments, teams, locations, titles, etc.) to share the resource.

In one embodiment, a system is disclosed, comprising: a network interface to a network; a processor having machine-readable instructions that when read by the processor cause the processor to perform: detecting a conferencing application and a second application are being executed by the system, wherein the conferencing application provides conference content to a number of participant devices via the network, and wherein the conference content comprises an image of an output of the second application configured with a resource; accessing an address of the resource from the second application; and providing the address to the conferencing application to be included as a portion of conference content.

In another embodiment, a method is disclosed comprising: detecting a conferencing application and a second application are being executed by a system, wherein the conferencing application provides conference content to a number of participant devices via a network, and wherein the conference content comprises an image of an output of the second application configured with a resource; accessing an address of the resource from the second application; and providing the address to the conferencing application to be included as a portion of conference content.

In another embodiment, a system is disclosed, comprising: means to detect a conferencing application and a second application are being executed by the system, wherein the conferencing application provides conference content to a number of participant devices via the network, and wherein the conference content comprises an image of an output of the second application configured with a resource; means to access an address of the resource from the second application; and means to provide the address to the conferencing application to be included as a portion of conference content.

A system on a chip (SoC) including any one or more of the above embodiments or aspects of the embodiments described herein.

One or more means for performing any one or more of the above or aspects of the embodiments described herein.

Any aspect in combination with any one or more other aspects.

Any one or more of the features disclosed herein.

Any one or more of the features as substantially disclosed herein.

Any one or more of the features as substantially disclosed herein in combination with any one or more other features as substantially disclosed herein.

Any one of the aspects/features/embodiments in combination with any one or more other aspects/features/embodiments.

Use of any one or more of the aspects or features as disclosed herein.

Any of the above embodiments or aspects, wherein the data storage comprises a non-transitory storage device comprise at least one of: an on-chip memory within the processor, a register of the processor, an on-board memory co-located on a processing board with the processor, a memory accessible to the processor via a bus, a magnetic media, an optical media, a solid-state media, an input-output buffer, a memory of an input-output component in communication with the processor, a network communication buffer, and a networked component in communication with the processor via a network interface.

It is to be appreciated that any feature described herein can be claimed in combination with any other feature(s) as described herein, regardless of whether the features come from the same described embodiment.

The phrases "at least one," "one or more," "or," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B, and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an embodiment that is entirely hardware, an embodiment that is entirely software (including firmware, resident software, micro-code, etc.) or an embodiment combining software and hardware aspects that may all generally be referred to herein as a "circuit," "module," or "system." Any combination of one or more computer-readable medium(s) may be utilized. The computer-readable medium may be a computer-readable signal medium or a computer-readable storage medium.

A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible, non-transitory medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including, but not limited to, wireless, wireline, optical fiber cable, RF, etc., or any suitable combination of the foregoing.

The terms "determine," "calculate," "compute," and variations thereof, as used herein, are used interchangeably and include any type of methodology, process, mathematical operation or technique.

The term "means" as used herein shall be given its broadest possible interpretation in accordance with 35 U.S.C., Section 112(f) and/or Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The preceding is a simplified summary of the invention to provide an understanding of some aspects of the invention. This summary is neither an extensive nor exhaustive overview of the invention and its various embodiments. It is intended neither to identify key or critical elements of the invention nor to delineate the scope of the invention but to present selected concepts of the invention in a simplified form as an introduction to the more detailed description presented below. As will be appreciated, other embodiments of the invention are possible utilizing, alone or in combination, one or more of the features set forth above or described in detail below. Also, while the disclosure is presented in terms of exemplary embodiments, it should be appreciated that an individual aspect of the disclosure can be separately claimed.

BRIEF DESCRIPTION OF THE DRAWINGS

The present disclosure is described in conjunction with the appended figures.

DETAILED DESCRIPTION

The ensuing description provides embodiments only and is not intended to limit the scope, applicability, or configuration of the claims. Rather, the ensuing description will provide those skilled in the art with an enabling description for implementing the embodiments. It will be understood that various changes may be made in the function and arrangement of elements without departing from the spirit and scope of the appended claims.

Any reference in the description comprising a numeric reference number, without an alphabetic sub-reference identifier when a sub-reference identifier exists in the figures, when used in the plural, is a reference to any two or more elements with a like reference number. When such a reference is made in the singular form, but without identification of the sub-reference identifier, is a reference one of the like numbered elements, but without limitation as to the particular one of the elements. Any explicit usage herein to the contrary or providing further qualification or identification shall take precedence.

The exemplary systems and methods of this disclosure will also be described in relation to analysis software, modules, and associated analysis hardware. However, to avoid unnecessarily obscuring the present disclosure, the following description omits well-known structures, components, and devices, which may be omitted from or shown in a simplified form in the figures or otherwise summarized.

For purposes of explanation, numerous details are set forth in order to provide a thorough understanding of the present disclosure. It should be appreciated, however, that the present disclosure may be practiced in a variety of ways beyond the specific details set forth herein.

Figure 1:
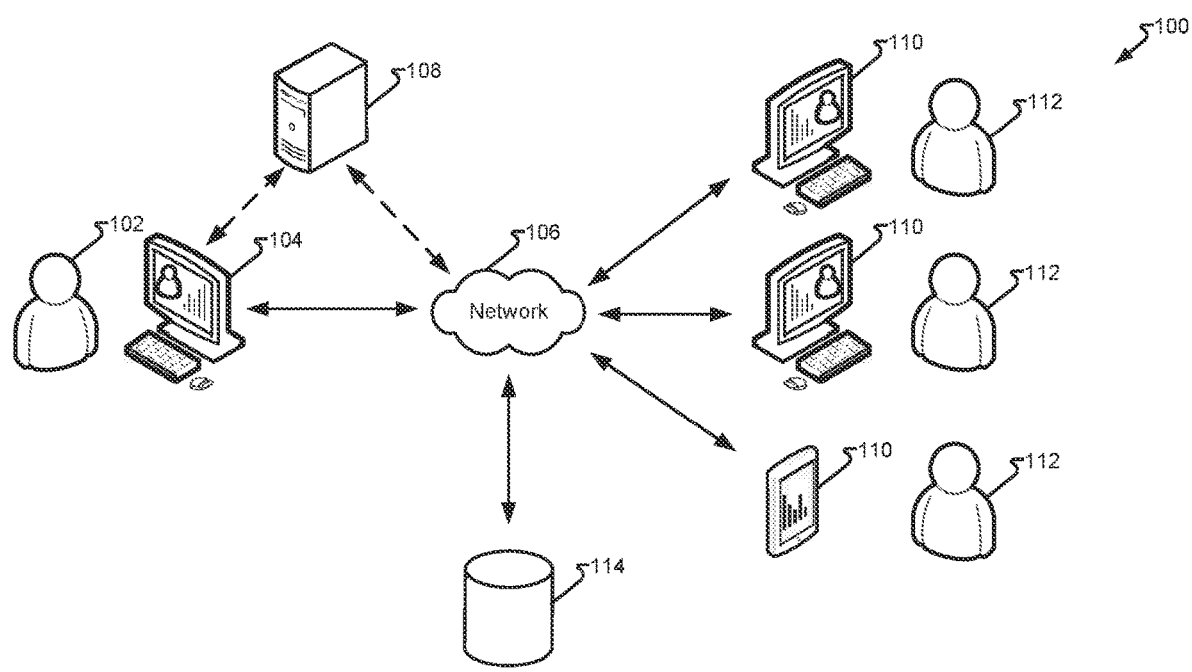
FIG. 1 depicts a first system in accordance with embodiments of the present disclosure.

FIG. 1 depicts system 100 in accordance with embodiments of the present disclosure. In one embodiment, presenter device 104, operated by presenter 102 is engaged in a conference over network 106 with participant device 110, operated by participant 112. It should be appreciated participant device 110 may comprise one or more participant devices 110, each of which corresponding to at least one participant 112. Each of participant device 110 is operable to receive conference content of a conference, comprising a visual portion (e.g., images, video, etc.) and textual information, in the form of addresses (as will be described in greater detail with respect to the embodiments that follow). The conference may further comprise audio, text, and/or other content. Additionally or alternatively, the addresses are automatically formatted as a link to cause a resource to be accessed, which may further cause an application associated with the resource to be launched. For example, an address may be to a spreadsheet and a link provided thereto. The link may be automatically accessed or manually accessed (e.g., click with a pointer operated by a mouse, trackpad, touch screen, etc.) causes a native spreadsheet application to be launched and load the resource.

As used herein "application" as used herein are executable programs, or portions thereof, having at least one graphical element that presents visual information on a display of the executing device (e.g., presenter device 104 and/or participant device 110). The graphical element may comprise one or more of a window, dialog, icon, a portion thereof, and/or other output to a display, such as of presenter device 104 and/or participant device 110.

In one embodiment, presenter device 104 is hosting a conference wherein conference content (e.g., visual images, audio, text, etc.) are provided to participant device 110. It should be appreciated that the conference may comprise at least a portion of the conference content originating form participant device 110. The network topology illustrated may be varied without departing from the scope of the embodiments herein. For example, presenter device 104 may serve the conference as well as provide content to the conference, such as to manage connections, grand/deny permission for particular participant 112 to join, floor control, hand-raise management, etc. and omit server 108; which may be sufficient if the number of participant devices 110 is relatively small. However, in other embodiments, server 108 may receive the conference content and broadcast the conference content to each participant device 110, as well as manage the conference and the connections and dataflow to/from each participant device 110.

In another embodiment, presenter 102 may wish to discuss a particular resource, such as a document, spreadsheet, website or webpage, image, etc. Presenter device 104 is currently in "screen share" mode wherein the application utilized to access the resource, such as a word processing application or document viewer, spreadsheet application, web browser, image viewer, etc. As a result, participant device 110 is presented with an image of the application as a portion of the image of the screen as it appears on presenter device 104. However, viewing the application in the form of a screen share image encoded and transmitted over network 106 may degrade the quality of the image, which could be exacerbated by a particular participant device 110 having a small screen size (e.g., mobile phone, tablet, etc.) and/or utilizing network 106, or portions thereof, with insufficient bandwidth or other quality issues. As the resource, when viewed as a portion of a screen share image, is limited to read-only mode, and only as presented on host device 104. As a result, an image of an application that is presenting text may be unreadable on participant device 110. Additionally, if participant 112 wishes to access another portion of a resource (e.g., alter the view, navigate to a different page of a document or spreadsheet, navigate to a different page or content of a website, etc.) they must ask presenter 102 to provide the inputs to the application to cause the application to present the desired information. If only one particular participant 112 is interested, the entire conference is presented with irrelevant information.

In another embodiment, presenter device 104 and/or server 108 encodes resource addresses into a link and causes the link to be presented as a portion of the conference content. For example, accessing a document may provide a link to the document to participant device 110 and thereby allow participant device 110 to automatically and/or with inputs from participant 112 to open the resource and a native application executing on participant device 110. For example, a word processing application installed on participant device 110 is launched with a link to the resource and thereby executes the application configured with the resource.

Network 106 is variously embodied and may comprise public, private, authorized, unauthorized, or otherwise accessible and non-accessible pathways to a particular resource. For example, a spreadsheet may be maintained locally on presenter device 104 and be inaccessible to participant device 110. Alternatively, a resource may be behind a firewall or other security demarcation that makes the resource inaccessible to participant device 110. Accordingly, presenter device 104 and/or server 108 may copy the resource to secondary location 114 and provide a link to the address of the copy to participant device 110. Secondary location 114 may be a designated accessible location, such as an enterprise-wide accessible storage device or network address, a "cloud" storage device, and/or other location designated for storage of resources accessible to participant device 110. Accordingly, participant device 110 may access the copy with a native application by selected (automatically or manually) the link to the copy.

Figure 2:
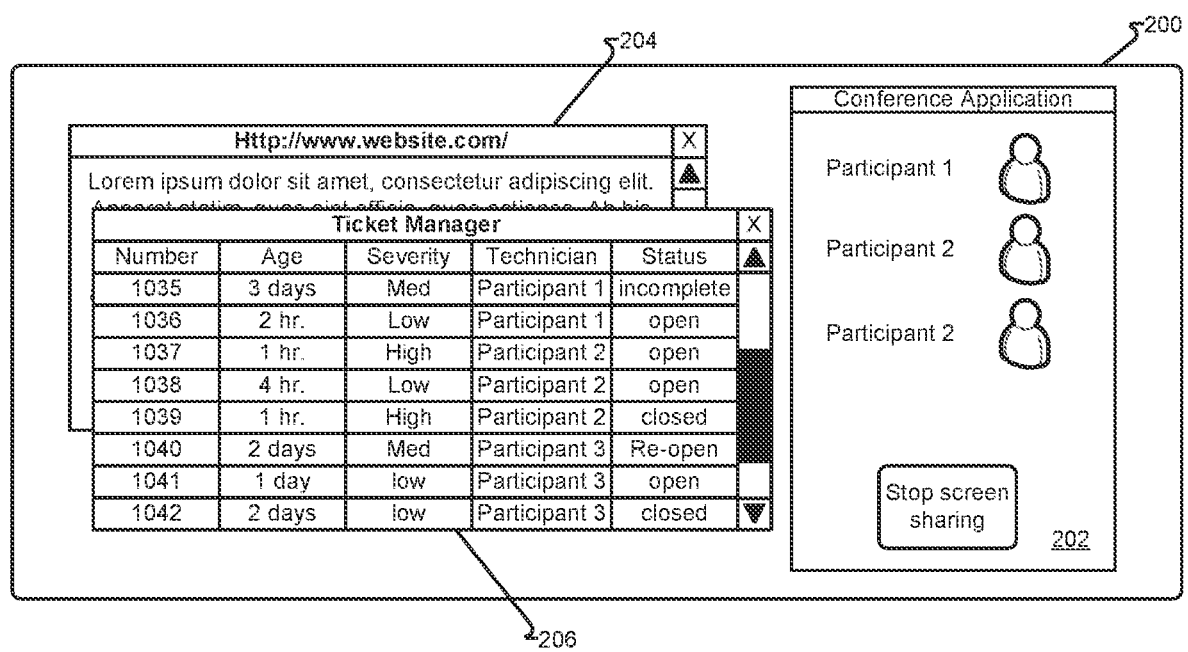
FIG. 2 depicts a first display in accordance with embodiments of the present disclosure.

FIG. 2 depicts display 200 in accordance with embodiments of the present disclosure. In one embodiment, presenter device 104 displays display 200 which illustrates the currently presented visual contents on a display of presenter device 104. Display 200 may comprise conferencing application 202, application window 204, application window 206, and/or other visual elements. Here, presenter device display 200 is being shared with participant device 110 wherein an image of participant device 110 is presented as conference content by a conferencing application of participant device 110. Presentation of the conferencing application 202 itself may be omitted from the conference content.

Figure 3:
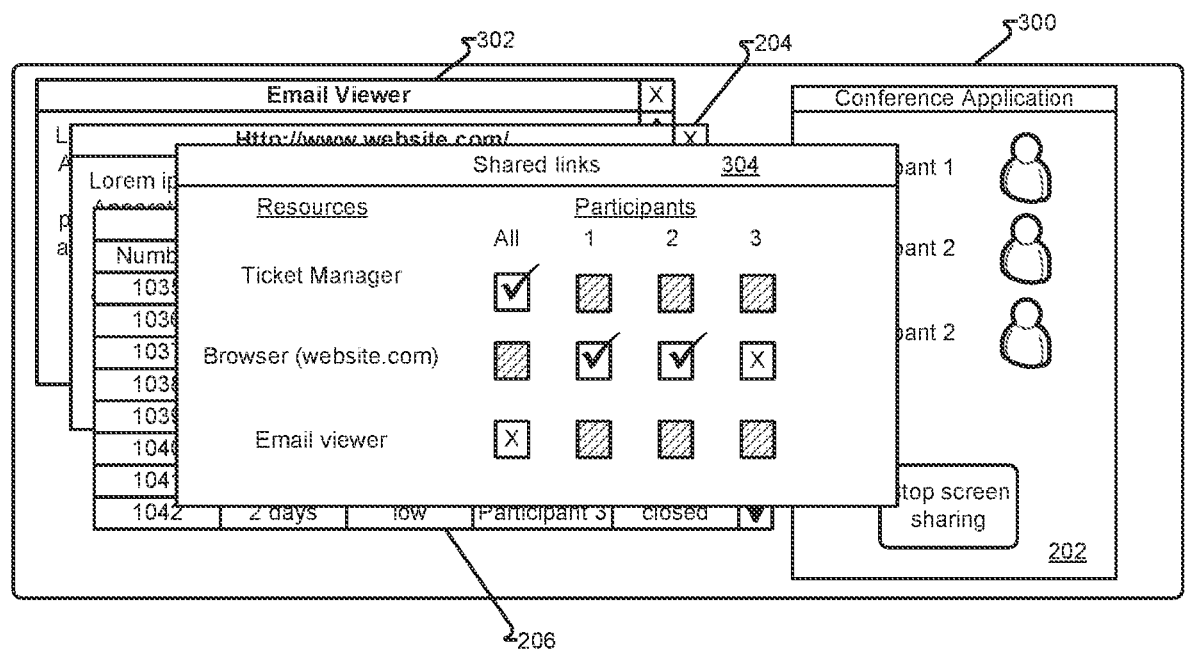
FIG. 3 depicts a second display in accordance with embodiments of the present disclosure.

FIG. 3 depicts display 300 in accordance with embodiments of the present disclosure. In one embodiment, presenter device 104 displays display 300 which illustrates the currently presented visual contents on a display of device 104. Before and/or during the conference, shared links dialog 304 may be presented to receive inputs from presenter 102 to indicate applications that will be shared with each participant 112, no participant 112, and/or particular participant 112. For example, application window 302 may be an email application executing on presenter device 104 and designated to be excluded from the conference content. As a result, no link to the email application's data file (one particular resource) is provided as a portion of the conference content. A resource associated with application window 204 may be provided to select participant device 110 (e.g., participant 1 and 2, but not 3), and the resource associated with application window 206 provided to all participants. The selection of particular participants maybe based on individual names and/or attributes (e.g., members of a particular department, team, location, title, rank, etc.). For example, application window 204 may be visually presented as an image during the conference to all participant device 110 as a screen share image, but a link to the resource only provided to "senior technical staff" or other participant attribute.

Figure 4:
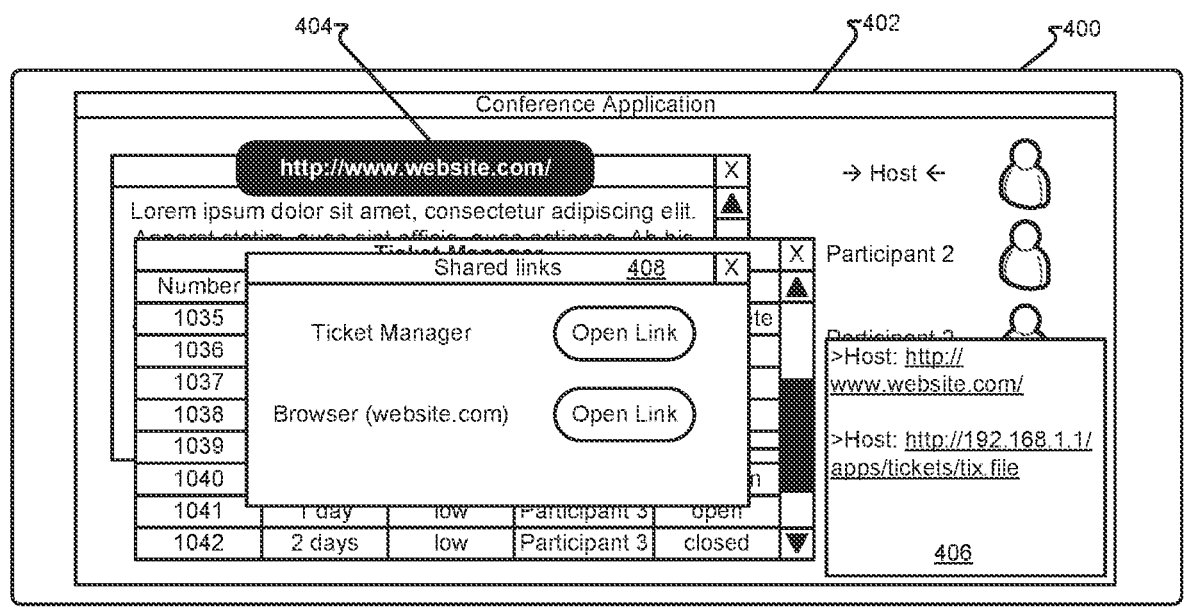
FIG. 4 depicts a third display in accordance with embodiments of the present disclosure.

FIG. 4 depicts display 400 in accordance with embodiments of the present disclosure. In one embodiment, participant device 110 displays display 400 which illustrates the currently presented visual contents on a display of participant device 110. In one embodiment, presenter 102 is screen sharing and providing an image of the current screen presented on presenter device 104, such as may be presented in participant conferencing application 402. Additionally, links to resources have been provided, such as clickable overlay 404, content in chat window 406, and/or available links dialog 408. A pointer, such as a pointer controlled by a mouse, touchscreen, touchpad, etc., may "mouse over" clickable overlay 404 and be presented with metadata regarding the link, the metadata may comprise the location of the resource, version, application used to open the resource, owner, last edit, etc. Participant device 110 may be configured to always open the links to the resource, open certain links to resources (e.g., open links to the ticket application database) and, if necessary, launch a native application executing on participant device 110 (e.g., a technical support ticket application) configured with the resource.

Figure 5:
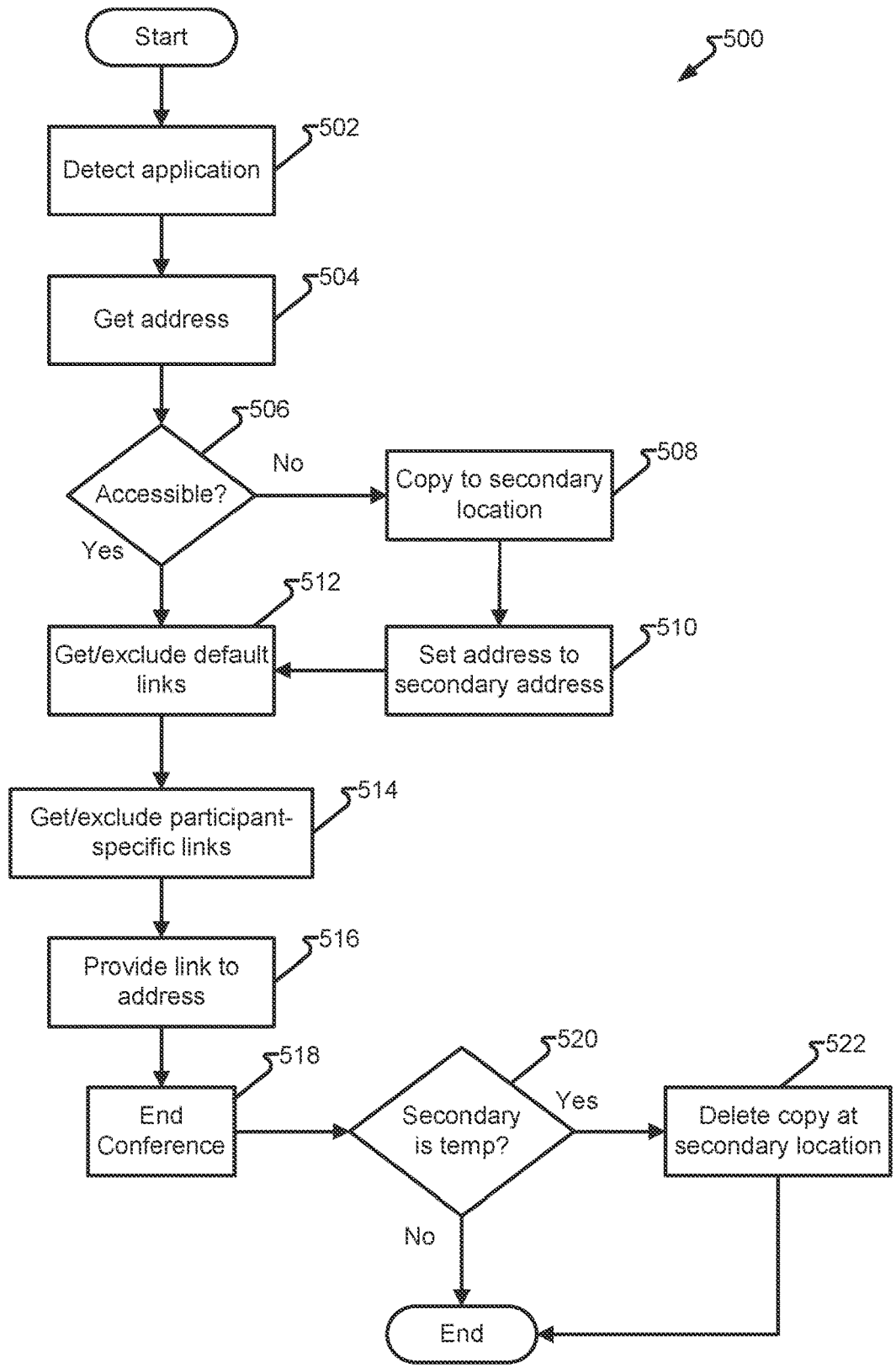
FIG. 5 depicts a process in accordance with embodiments of the present disclosure.

FIG. 5 depicts process 500 in accordance with embodiments of the present disclosure. In one embodiment, process 500 is embodied as machine-readable instructions that when read by a machine, such as at least one processor of presenter device 104 and/or server 108, cause the machine to perform the steps of process 500. In one embodiment, a conference is currently underway, such as when conference content is provided to at least one participant device 110 by presenter device 104. Step 502 detects that an application(s) is executed on participant device 110. Step 502 may detect all applications or only certain applications. For example, an email client application may be executed under step 502 whether or not it is currently being executed. In contrast, a word processing document, web browser, spreadsheet, and/or other application may be detected and included for further processing. Step 504 obtains the address of a particular resource being accessed by the application. The address may be a local storage location, network storage location (e.g., relative pathname, fully qualified pathname, etc.), external location (e.g., cloud storage, website, etc.) and/or other indicia of the location of the resource.

Test 506 may determine if the address obtained in step 504 are accessible to participant device 110. For example, a data structure may be obtained listing network addresses, usernames, etc., for a particular participant device 110 and whether or not participant device 110 is able to access a source at the address. If test 506 is determined in the affirmative, processing continues to step 512. If test 506 is determined in the negative, processing continues to step 508, wherein a copy of the resource is mode to a secondary location (e.g., cloud storage location, alternative location on an enterprise's network, etc.) that is accessible to participant device 110. Step 510 then sets the secondary address as the address.

Step 512 may identify certain links to always include and/or always exclude. For example, participant device 110 may configure the conferencing client to never include links to an email database (e.g., application window 302) or to always include links to technical support system (e.g., application window 206) as a portion of the conference content. As a result, even if participant device 110 is executing an email application, no link is provided to participant device 110. In contrast, if participant device 110 is executing a technical support ticket application, a link is always provided to participant device 110. Step 514 may optionally be provided to allow for user and/or user attribute discrimination of who will, and will not, receive a link to some, all, or particular application resources. And, in step 516, a link is provided to participant device 110. In step 518, the conference ends and test 520 determines if the secondary location is a temporary location. If test 520 is determined in the negative, process 500 ends. If 520 is determined in the affirmative, step 522 deletes the copy of the resource at the secondary location. As a further option step 522 may be executed after a delay, such as after ten minutes after the conference has ended, upon participant device 110 termination of access to the resource, etc., after which process 500 ends.

Figure 6:
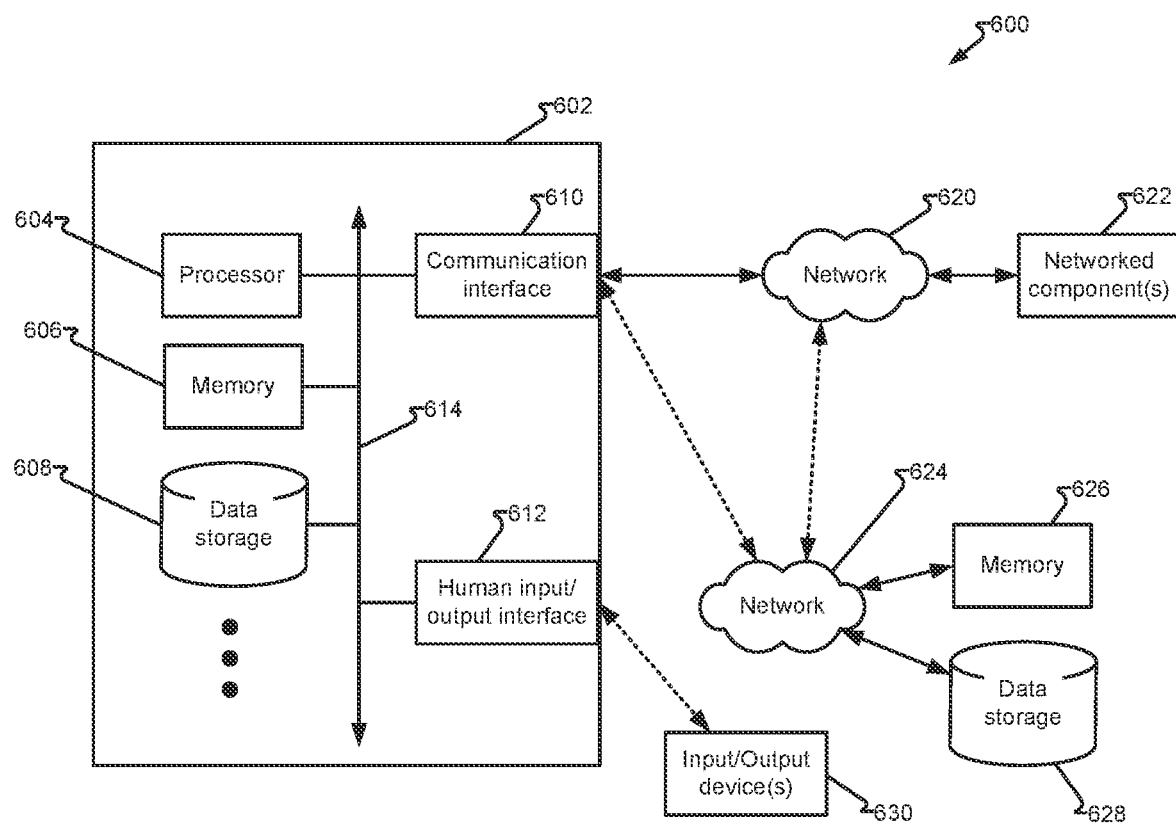
FIG. 6 depicts a second system in accordance with embodiments of the present disclosure.

FIG. 6 depicts device 602 in system 600 in accordance with embodiments of the present disclosure. In one embodiment, presenter device 104 and/or server 108 may be embodied, in whole or in part, as device 602 comprising various components and connections to other components and/or systems. The components are variously embodied and may comprise processor 604. The term "processor," as used herein, refers exclusively to electronic hardware components comprising electrical circuitry with connections (e.g., pin-outs) to convey encoded electrical signals to and from the electrical circuitry. Processor 604 may be further embodied as a single electronic microprocessor or multiprocessor device (e.g., multicore) having electrical circuitry therein which may further comprise a control unit(s), input/output unit(s), arithmetic logic unit(s), register(s), primary memory, and/or other components that access information (e.g., data, instructions, etc.), such as received via bus 614, executes instructions, and outputs data, again such as via bus 614. In other embodiments, processor 604 may comprise a shared processing device that may be utilized by other processes and/or process owners, such as in a processing array within a system (e.g., blade, multi-processor board, etc.) or distributed processing system (e.g., "cloud", farm, etc.). It should be appreciated that processor 604 is a non-transitory computing device (e.g., electronic machine comprising circuitry and connections to communicate with other components and devices). Processor 604 may operate a virtual processor, such as to process machine instructions not native to the processor (e.g., translate the VAX operating system and VAX machine instruction code set into Intel® 9xx chipset code to allow VAX-specific applications to execute on a virtual VAX processor), however, as those of ordinary skill understand, such virtual processors are applications executed by hardware, more specifically, the underlying electrical circuitry and other hardware of the processor (e.g., processor 604). Processor 604 may be executed by virtual processors, such as when applications (i.e., Pod) are orchestrated by Kubernetes. Virtual processors allow an application to be presented with what appears to be a static and/or dedicated processor executing the instructions of the application, while underlying non-virtual processor(s) are executing the instructions and may be dynamic and/or split among a number of processors.

In addition to the components of processor 604, device 602 may utilize memory 606 and/or data storage 608 for the storage of accessible data, such as instructions, values, etc. Communication interface 610 facilitates communication with components, such as processor 604 via bus 614 with components not accessible via bus 614. Communication interface 610 may be embodied as a network port, card, cable, or other configured hardware device. Additionally or alternatively, human input/output interface 612 connects to one or more interface components to receive and/or present information (e.g., instructions, data, values, etc.) to and/or from a human and/or electronic device. Examples of input/output devices 630 that may be connected to input/output interface include, but are not limited to, keyboard, mouse, trackball, printers, displays, sensor, switch, relay, speaker, microphone, still and/or video camera, etc. In another embodiment, communication interface 610 may comprise, or be comprised by, human input/output interface 612. Communication interface 610 may be configured to communicate directly with a networked component or utilize one or more networks, such as network 620 and/or network 624.

Network 106 may be embodied, in whole or in part, as network 620. Network 620 may be a wired network (e.g., Ethernet), wireless (e.g., WiFi, Bluetooth, cellular, etc.) network, or combination thereof and enable device 602 to communicate with networked component(s) 622. In other embodiments, network 620 may be embodied, in whole or in part, as a telephony network (e.g., public switched telephone network (PSTN), private branch exchange (PBX), cellular telephony network, etc.)

Additionally or alternatively, one or more other networks may be utilized. For example, network 624 may represent a second network, which may facilitate communication with components utilized by device 602. For example, network 624 may be an internal network to a business entity or other organization, whereby components are trusted (or at least more so) that networked components 622, which may be connected to network 620 comprising a public network (e.g., Internet) that may not be as trusted.

Components attached to network 624 may include memory 626, data storage 628, input/output device(s) 630, and/or other components that may be accessible to processor 604. For example, memory 626 and/or data storage 628 may supplement or supplant memory 606 and/or data storage 608 entirely or for a particular task or purpose. For example, memory 626 and/or data storage 628 may be an external data repository (e.g., server farm, array, "cloud," etc.) and allow device 602, and/or other devices, to access data thereon. Similarly, input/output device(s) 630 may be accessed by processor 604 via human input/output interface 612 and/or via communication interface 610 either directly, via network 624, via network 620 alone (not shown), or via networks 624 and 620. Each of memory 606, data storage 608, memory 626, data storage 628 comprise a non-transitory data storage comprising a data storage device.

It should be appreciated that computer readable data may be sent, received, stored, processed, and presented by a variety of components. It should also be appreciated that components illustrated may control other components, whether illustrated herein or otherwise. For example, one input/output device 630 may be a router, switch, port, or other communication component such that a particular output of processor 604 enables (or disables) input/output device 630, which may be associated with network 620 and/or network 624, to allow (or disallow) communications between two or more nodes on network 620 and/or network 624. One of ordinary skill in the art will appreciate that other communication equipment may be utilized, in addition or as an alternative, to those described herein without departing from the scope of the embodiments.

In the foregoing description, for the purposes of illustration, methods were described in a particular order. It should be appreciated that in alternate embodiments, the methods may be performed in a different order than that described without departing from the scope of the embodiments. It should also be appreciated that the methods described above may be performed as algorithms executed by hardware components (e.g., circuitry) purpose-built to carry out one or more algorithms or portions thereof described herein. In another embodiment, the hardware component may comprise a general-purpose microprocessor (e.g., CPU, GPU) that is first converted to a special-purpose microprocessor. The special-purpose microprocessor then having had loaded therein encoded signals causing the, now special-purpose, microprocessor to maintain machine-readable instructions to enable the microprocessor to read and execute the machine-readable set of instructions derived from the algorithms and/or other instructions described herein. The machine-readable instructions utilized to execute the algorithm(s), or portions thereof, are not unlimited but utilize a finite set of instructions known to the microprocessor. The machine-readable instructions may be encoded in the microprocessor as signals or values in signal-producing components and included, in one or more embodiments, voltages in memory circuits, configuration of switching circuits, and/or by selective use of particular logic gate circuits. Additionally or alternative, the machine-readable instructions may be accessible to the microprocessor and encoded in a media or device as magnetic fields, voltage values, charge values, reflective/non-reflective portions, and/or physical indicia.

In another embodiment, the microprocessor further comprises one or more of a single microprocessor, a multi-core processor, a plurality of microprocessors, a distributed processing system (e.g., array(s), blade(s), server farm(s), "cloud", multi-purpose processor array(s), cluster(s), etc.) and/or may be co-located with a microprocessor performing other processing operations. Any one or more microprocessor may be integrated into a single processing appliance (e.g., computer, server, blade, etc.) or located entirely or in part in a discrete component connected via a communications link (e.g., bus, network, backplane, etc. or a plurality thereof).

Examples of general-purpose microprocessors may comprise, a central processing unit (CPU) with data values encoded in an instruction register (or other circuitry maintaining instructions) or data values comprising memory locations, which in turn comprise values utilized as instructions. The memory locations may further comprise a memory location that is external to the CPU. Such CPU-external components may be embodied as one or more of a field-programmable gate array (FPGA), read-only memory (ROM), programmable read-only memory (PROM), erasable programmable read-only memory (EPROM), random access memory (RAM), bus-accessible storage, network-accessible storage, etc.

These machine-executable instructions may be stored on one or more machine-readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

In another embodiment, a microprocessor may be a system or collection of processing hardware components, such as a microprocessor on a client device and a microprocessor on a server, a collection of devices with their respective microprocessor, or a shared or remote processing service (e.g., "cloud" based microprocessor). A system of microprocessors may comprise task-specific allocation of processing tasks and/or shared or distributed processing tasks. In yet another embodiment, a microprocessor may execute software to provide the services to emulate a different microprocessor or microprocessors. As a result, first microprocessor, comprised of a first set of hardware components, may virtually provide the services of a second microprocessor whereby the hardware associated with the first microprocessor may operate using an instruction set associated with the second microprocessor.

While machine-executable instructions may be stored and executed locally to a particular machine (e.g., personal computer, mobile computing device, laptop, etc.), it should be appreciated that the storage of data and/or instructions and/or the execution of at least a portion of the instructions may be provided via connectivity to a remote data storage and/or processing device or collection of devices, commonly known as "the cloud," but may include a public, private, dedicated, shared and/or other service bureau, computing service, and/or "server farm."

Examples of the microprocessors as described herein may include, but are not limited to, at least one of Qualcomm® Snapdragon® 800 and 801, Qualcomm® Snapdragon® 610 and 615 with 4G LTE Integration and 64-bit computing, Apple® A7 microprocessor with 64-bit architecture, Apple® M7 motion comicroprocessors, Samsung® Exynos® series, the Intel® Core™ family of microprocessors, the Intel® Xeon® family of microprocessors, the Intel® Atom™ family of microprocessors, the Intel Itanium® family of microprocessors, Intel® Core® i5-4670K and i7-4770K 22 nm Haswell, Intel® Core® i5-3570K 22 nm Ivy Bridge, the AMD® FX™ family of microprocessors, AMD® FX-4300, FX-6300, and FX-8350 32 nm Vishera, AMD® Kaveri microprocessors, Texas Instruments® Jacinto C6000™ automotive infotainment microprocessors, Texas Instruments® OMAP™ automotive-grade mobile microprocessors, ARM® Cortex™-M microprocessors, ARM® Cortex-A and ARM926EJ-S™ microprocessors, other industry-equivalent microprocessors, and may perform computational functions using any known or future-developed standard, instruction set, libraries, and/or architecture.

Any of the steps, functions, and operations discussed herein can be performed continuously and automatically.

The exemplary systems and methods of this invention have been described in relation to communications systems and components and methods for monitoring, enhancing, and embellishing communications and messages. However, to avoid unnecessarily obscuring the present invention, the preceding description omits a number of known structures and devices. This omission is not to be construed as a limitation of the scope of the claimed invention. Specific details are set forth to provide an understanding of the present invention. It should, however, be appreciated that the present invention may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components or portions thereof (e.g., microprocessors, memory/storage, interfaces, etc.) of the system can be combined into one or more devices, such as a server, servers, computer, computing device, terminal, "cloud" or other distributed processing, or collocated on a particular node of a distributed network, such as an analog and/or digital telecommunications network, a packet-switched network, or a circuit-switched network. In another embodiment, the components may be physical or logically distributed across a plurality of components (e.g., a microprocessor may comprise a first microprocessor on one component and a second microprocessor on another component, each performing a portion of a shared task and/or an allocated task). It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the invention.

A number of variations and modifications of the invention can be used. It would be possible to provide for some features of the invention without providing others.

In yet another embodiment, the systems and methods of this invention can be implemented in conjunction with a special purpose computer, a programmed microprocessor or microcontroller and peripheral integrated circuit element(s), an ASIC or other integrated circuit, a digital signal microprocessor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this invention. Exemplary hardware that can be used for the present invention includes computers, handheld devices, telephones (e.g., cellular, Internet enabled, digital, analog, hybrids, and others), and other hardware known in the art. Some of these devices include microprocessors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein as provided by one or more processing components.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this invention can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Embodiments herein comprising software are executed, or stored for subsequent execution, by one or more microprocessors and are executed as executable code. The executable code being selected to execute instructions that comprise the particular embodiment. The instructions executed being a constrained set of instructions selected from the discrete set of native instructions understood by the microprocessor and, prior to execution, committed to microprocessor-accessible memory. In another embodiment, human-readable "source code" software, prior to execution by the one or more microprocessors, is first converted to system software to comprise a platform (e.g., computer, microprocessor, database, etc.) specific set of instructions selected from the platform's native instruction set.

Although the present invention describes components and functions implemented in the embodiments with reference to particular standards and protocols, the invention is not limited to such standards and protocols. Other similar standards and protocols not mentioned herein are in existence and are considered to be included in the present invention. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present invention.

The present invention, in various embodiments, configurations, and aspects, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments, configurations, or aspects for the purpose of streamlining the disclosure. The features of the embodiments, configurations, or aspects of the invention may be combined in alternate embodiments, configurations, or aspects other than those discussed above. This method of disclosure is not to be interpreted as reflecting an intention that the claimed invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the invention.

Moreover, though the description of the invention has included description of one or more embodiments, configurations, or aspects and certain variations and modifications, other variations, combinations, and modifications are within the scope of the invention, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

What is claimed is:

1. A system, comprising:
a network interface to a network;
a processor having machine-readable instructions that when read by the processor cause the processor to perform:
detecting that a conferencing application and a second application are being executed by the system, wherein the conferencing application provides conference content to a number of participant devices via the network participating in a conference, and when true, further determining that the conference content comprises an image of an output of the second application configured with a resource associated with the second application;
in response to detecting that the conference content comprises the image of the output of the second application configured with the resource, accessing an address of the resource from the second application, wherein the address is one of a first address representing a permanent location of the resource or a second address representing a temporary location of the resource copied from the permanent location;
providing the address to the conferencing application to be included as a portion of conference content wherein the address is automatically formatted to be included as the portion of the conference content as a link for launching the resource;
enabling the resource to be accessed for viewing in a native format via the second application on at least one of the number of participating devices, wherein the link for launching the resource is selected by an input of at least one of the number of participating devices; and
upon termination of the conference comprising the conference content, remove a copy of the copied resource from the second address.

2. The system of claim 1, wherein:
the resource comprises a plurality of resources; and
the address comprises a plurality of addresses corresponding to ones of the plurality of resources.

3. The system of claim 2, further comprising:
accessing a plurality of indicators corresponding to each of the plurality of resources;

wherein a first subset of the plurality of indicators indicates a first subset of the plurality of addresses, corresponding to ones of the plurality of resources to be shared;

wherein a second subset of the plurality of indicators a second subset of the plurality of addresses, corresponding to ones of the plurality of resources to be not shared; and wherein providing the address to the conferencing application to be included as the portion of conference content, comprising providing the first subset of the plurality of addresses and omitting the second subset of the plurality of addresses to the conferencing application to be included as the portion of the conference content.

4. The system of claim 3, wherein the plurality of indicators further comprises indicia of a corresponding one of the number of participant devices.

5. The system of claim 1, wherein accessing the address of the resource further comprises performing a character recognition on the image to determine the address from a graphical portion of the image.

6. The system of claim 5, wherein providing the address to the conferencing application to be included as the portion of conference content, further comprises providing the address to the conferencing application to be included as a link overlaying the graphical portion of the image.

7. The system of claim 1, wherein the instructions further cause the processor to perform:
selecting a second address;
copying the resource to the second address; and
providing the second address and the address to the conference content.

8. A method, comprising:
detecting that a conferencing application and a second application are being executed by a system, wherein the conferencing application provides conference content to a number of participant devices via a network participating in a conference, and when true, further determining that the conference content comprises an image of an output of the second application configured with a resource associated with the second application;
in response to detecting that the conference content comprises the image of the output of the second application configured with the resource, accessing an address of the resource from the second application, wherein the address is one of a first address representing a permanent location of the resource or a second address representing a temporary location of the resource copied from the permanent location;
providing the address to the conferencing application to be included as a portion of conference content wherein the address is automatically formatted to be included as the portion of the conference content as a link for launching the resource;
enabling the resource to be accessed for viewing in a native format via the second application on at least one of the number of participating devices, wherein the link for launching the resource is selected by an input of at least one of the number of participating devices; and
upon termination of the conference comprising the conference content, remove a copy of the copied resource from the second address.

9. The method of claim 8, wherein accessing the address of the resource further comprises performing a character recognition on the image to determine the address from a graphical portion of the image.

10. The method of claim 9, wherein providing the address to the conferencing application to be included as the portion of conference content, further comprises providing the address to the conferencing application to be included as a link overlaying the graphical portion of the image.

11. The method of claim 8, wherein:
the resource comprises a plurality of resources; and
the address comprises a plurality of addresses corresponding to ones of the plurality of resources.

12. The method of claim 11, further comprising:
accessing a plurality of indicators corresponding to each of the plurality of resources;
wherein a first subset of the plurality of indicators indicates a first subset of the plurality of addresses, corresponding to ones of the plurality of resources to be shared;
wherein a second subset of the plurality of indicators a second subset of the plurality of addresses, corresponding to ones of the plurality of resources to be not shared; and
wherein providing the address to the conferencing application to be included as the portion of conference content, comprising providing the first subset of the plurality of addresses and omitting the second subset of the plurality of addresses to the conferencing application to be included as the portion of the conference content.

13. The method of claim 8, further comprising:
selecting a second address;
copying the resource to the second address; and
providing the second address and the address to the conference content.

14. A system, comprising:
means to detect that a conferencing application and a second application are being executed by the system participating in a conference, wherein the conferencing application provides conference content to a number of participant devices via a network, and when true, means to further determine that the conference content comprises an image of an output of the second application configured with a resource associated with the second application;
means, in response to detecting that the conference content comprises the image of the output of the second application configured with the resource, to access an address of the resource from the second application, wherein the address is one of a first address representing a permanent location of the resource or a second address representing a temporary location of the resource copied from the permanent location; and
means to provide the address to the conferencing application to be included as a portion of conference content wherein the address is automatically formatted to be included as the portion of the conference content as a link for launching the resource;
means to enable the resource to be accessed for viewing in a native format via the second application on at least one of the number of participating devices, wherein the link for launching the resource is selected by an input of at least one of the number of participating devices; and
upon termination of the conference comprising the conference content, means to remove a copy of the copied resource from the second address.

15. The system of claim 14, wherein the means to access the address of the resource further comprise means to perform a character recognition on the image to determine the address from a graphical portion of the image.

16. The system of claim 15, wherein means to provide the address to the conferencing application to be included as the portion of conference content, further comprise means to provide the address to the conferencing application to be included as a link overlaying the graphical portion of the image.

* * * * *